US012779432B2

(12) United States Patent
Ryu et al.

(10) Patent No.: US 12,779,432 B2
(45) Date of Patent: Nov. 3, 2026

(54) PREPARATION METHOD FOR SUPER ABSORBENT POLYMER

(71) Applicant: LG Chem, Ltd., Seoul (KR)

(72) Inventors: Jihye Ryu, Daejeon (KR); Jungmin Sohn, Daejeon (KR); Tae Young Won, Daejeon (KR)

(73) Assignee: LG Chem, Ltd., Seoul (KR)

( * ) Notice: Subject to any disclaimer, the term of this patent is extended or adjusted under 35 U.S.C. 154(b) by 166 days.

(21) Appl. No.: 18/280,511

(22) PCT Filed: Feb. 8, 2023

(86) PCT No.: PCT/KR2023/001844

§ 371 (c)(1),
(2) Date: Sep. 6, 2023

(87) PCT Pub. No.: WO2023/153799

PCT Pub. Date: Aug. 17, 2023

(65) Prior Publication Data

US 2024/0238759 A1 Jul. 18, 2024

(30) Foreign Application Priority Data

Feb. 8, 2022 (KR) ........................ 10-2022-0016382
Feb. 8, 2023 (KR) ........................ 10-2023-0016731

(51) Int. Cl.
*B01J 20/26* (2006.01)
*B01J 20/28* (2006.01)
*B01J 20/30* (2006.01)

(52) U.S. Cl.
CPC ....... *B01J 20/267* (2013.01); *B01J 20/28047* (2013.01); *B01J 20/3021* (2013.01); *B01J 20/3064* (2013.01); *B01J 20/3085* (2013.01)

(58) Field of Classification Search
None
See application file for complete search history.

(56) References Cited

U.S. PATENT DOCUMENTS

| | | | |
|---|---|---|---|
| 5,338,766 | A | 8/1994 | Phan et al. |
| 5,451,452 | A | 9/1995 | Phan et al. |
| 5,506,035 | A | 4/1996 | Van Phan et al. |
| 6,107,358 | A | 8/2000 | Harada et al. |
| 2008/0200623 | A1 | 8/2008 | Weismantel et al. |
| 2008/0221282 | A1 | 9/2008 | Weismantel et al. |
| 2008/0269372 | A1 | 10/2008 | Dairoku et al. |
| 2011/0313113 | A1 | 12/2011 | Sakamoto et al. |
| 2014/0296465 | A1 | 10/2014 | Sakamoto et al. |
| 2014/0312273 | A1 | 10/2014 | Wattebled et al. |
| 2015/0283284 | A1 | 10/2015 | Azad et al. |
| 2017/0066862 | A1 | 3/2017 | Matsumoto et al. |
| 2018/0037686 | A1 | 2/2018 | Lee et al. |
| 2018/0228671 | A1 | 8/2018 | Hwang et al. |
| 2018/0265645 | A1 | 9/2018 | Nam et al. |
| 2019/0085104 | A1 | 3/2019 | Yoon et al. |
| 2019/0119452 | A1 | 4/2019 | Yoon et al. |
| 2019/0134603 | A1 | 5/2019 | Kim et al. |
| 2019/0217272 | A1 | 7/2019 | Hong et al. |
| 2019/0248963 | A1 | 8/2019 | Yoon et al. |
| 2021/0009725 | A1 * | 1/2021 | Nam ........................ C08J 3/243 |

FOREIGN PATENT DOCUMENTS

| | | | |
|---|---|---|---|
| CN | 102317329 | A | 1/2012 |
| CN | 104974312 | A | 10/2015 |
| CN | 106103495 | A | 11/2016 |
| CN | 107406558 | A | 11/2017 |
| CN | 107429034 | A | 12/2017 |
| CN | 107922637 | A | 4/2018 |
| CN | 108779266 | A | 11/2018 |
| CN | 109415516 | A | 3/2019 |
| EP | 0690729 | A1 | 1/1996 |
| EP | 0827753 | A2 | 3/1998 |
| EP | 1721663 | A1 | 11/2006 |
| EP | 2399944 | A1 | 12/2011 |
| EP | 2930191 | A1 | 10/2015 |
| EP | 3412711 | A1 | 12/2018 |
| JP | H08508527 | A | 9/1996 |
| JP | 2016211009 | A | 12/2016 |
| KR | 20150116418 | A | 10/2015 |
| KR | 20160128350 | A | 11/2016 |
| KR | 20170020113 | A | 2/2017 |
| KR | 20170090185 | A | 8/2017 |
| KR | 20180074586 | A | 7/2018 |
| KR | 20210038228 | A | 4/2021 |
| WO | 9422502 | A1 | 10/1994 |

(Continued)

OTHER PUBLICATIONS

Search Report dated Nov. 2, 2025 from the Office Action for Chinese Application No. 202380010251.5 issued Nov. 3, 2025, 3 pages.
Schwalm, R. "UV Coatings Basics, Recent Developments and New Application," Elsevier Science, Dec. 21, 2006, p. 115. (3 pgs.).
Odian, G. "Principles of Polymerization" Dec. 1981, p. 203, Wiley Interscience Publication. (3 pgs.).
International Search Report for PCT/KR2023/001844 mailed May 9, 2023. 4 pages. (see pp. 2-3 categorizing the cited references).
Third Party of Observation for Application No. PCT/KR2023/001844 dated Jul. 8, 2024. 8 pgs.
Extended European Search Report including Written Opinion for Application No. dated 23753147.0 Jul. 15, 2024.

(Continued)

*Primary Examiner* — Tanisha Diggs
(74) *Attorney, Agent, or Firm* — Lerner David LLP

(57) ABSTRACT

A preparation method for a super absorbent polymer capable of minimizing bubble loss during foam polymerization. According to the preparation method of the present disclosure, a large number of small and uniform pores are formed to produce a super absorbent polymer having a high surface area. Since the super absorbent polymer exhibits an excellent absorption rate, it can be used in various products requiring high absorption properties.

7 Claims, 4 Drawing Sheets

(56) References Cited

FOREIGN PATENT DOCUMENTS

| | | | | | |
|---|---|---|---|---|---|
| WO | 2015133440 | A1 | | 9/2015 | |
| WO | WO-2019190120 | A1 | * | 10/2019 | ................ C08J 3/12 |

* cited by examiner

Sample Dispersion Unit
Use SDU
Default Dispersion Settings
Low Energy
High Energy
Injection Pressure (bar)
1.0
Injection Time (ms)
20
Settling Time (sec)
60
Injection Volume Indicator

【FIG. 1】

【FIG. 2】
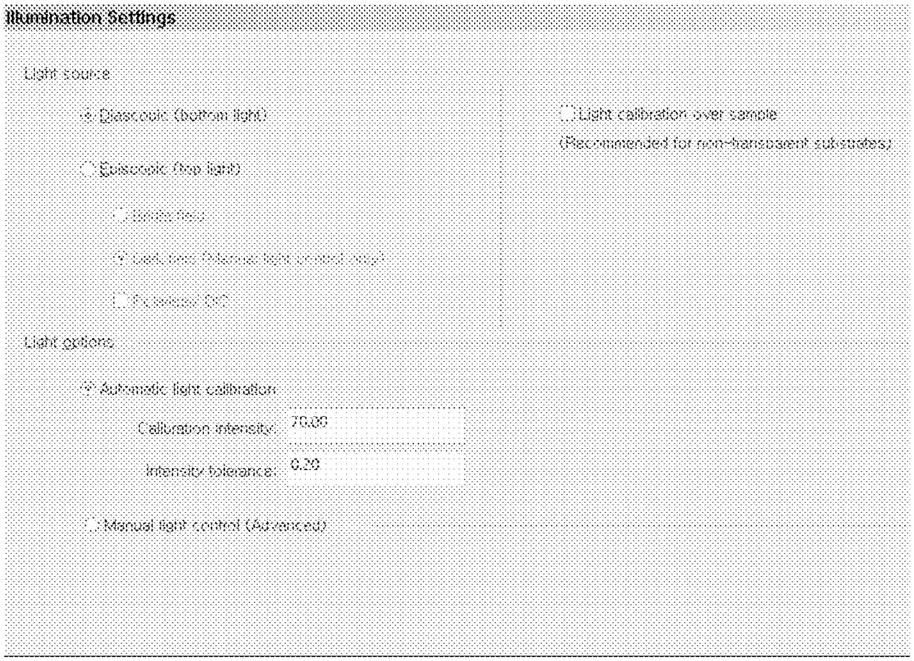
【FIG. 3】

【FIG. 4】
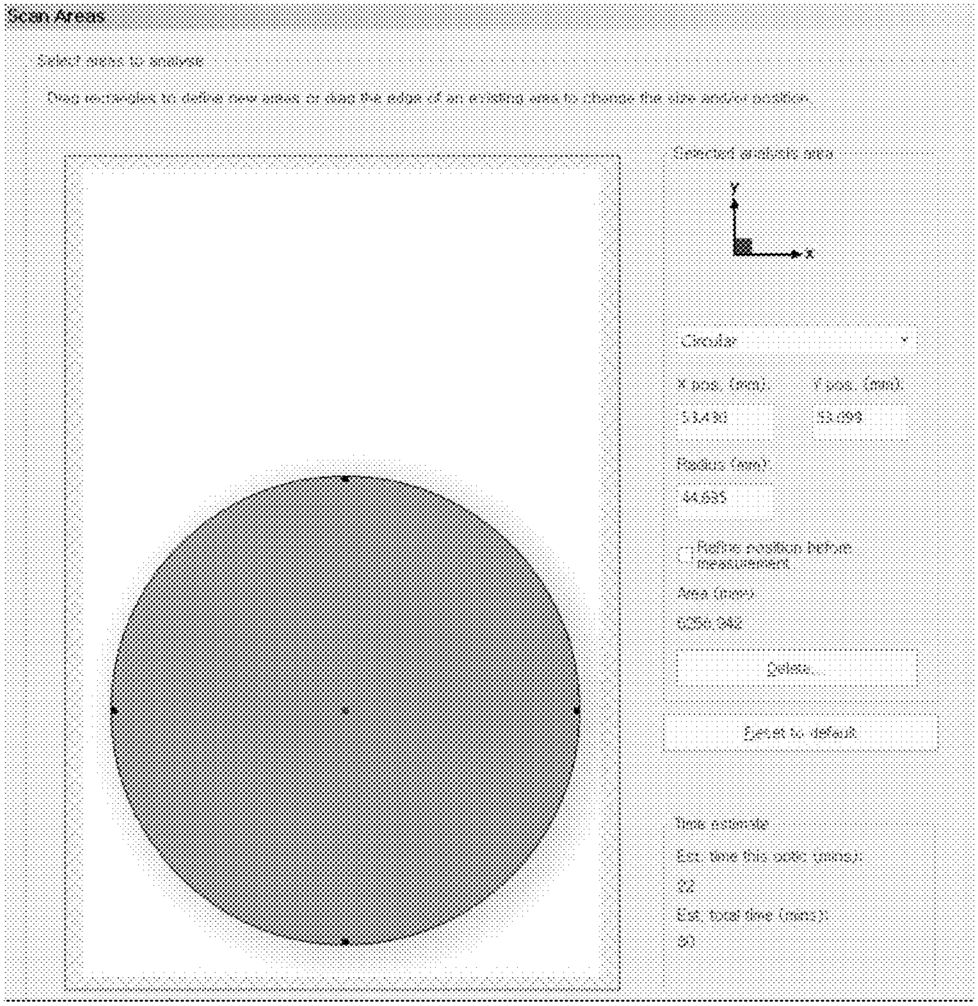

【FIG. 5】
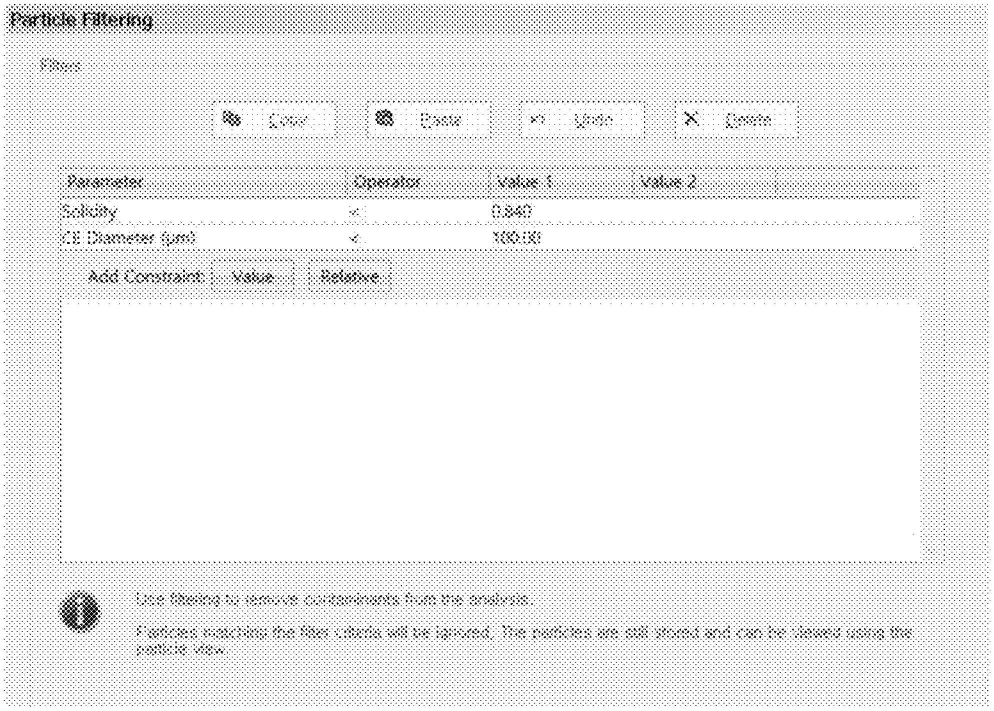

PREPARATION METHOD FOR SUPER ABSORBENT POLYMER

CROSS-REFERENCE TO RELATED APPLICATIONS

This application is a national phase entry under 35 U.S.C. § 371 of International Application No. PCT/KR2023/001844, filed on Feb. 8, 2023, which claims priority to Korean Patent Application No. 10-2022-0016382, filed on Feb. 8, 2022, and Korean Patent Application No. 10-2023-0016731, filed on Feb. 8, 2023, the entire contents all of which are hereby incorporated herein by reference.

TECHNICAL FIELD

A super absorbent polymer (SAP) is a type of synthetic polymeric material capable of absorbing 500 to 1000 times its own weight of moisture. Such super absorbent polymers started to be practically applied in sanitary products, and they are now being widely used not only for hygiene products such as disposable diapers for children, etc., but also for water retaining soil products for gardening, water stop materials for the civil engineering and construction, sheets for raising seedling, fresh-keeping agents for food distribution fields, materials for poultices, or the like.

BACKGROUND OF ART

These super absorbent polymers need to exhibit a fast absorption rate. In order to improve the absorption rate of the super absorbent polymer, a method of increasing the surface area by adding a foaming agent during polymerization to form a porous structure is known.

However, in the case of the conventional preparation method for a super absorbent polymer using a foaming agent, there is a problem in that carbon dioxide bubbles generated by the foaming agent are lost before polymerization of the acrylic acid-based monomer and sufficient pores are not formed in the super absorbent polymer. Accordingly, a method of reducing loss of bubbles by using a foam stabilizer together with a foaming agent has been proposed. However, when the amount of the foam stabilizer is increased for sufficient bubble capturing effect, there is an advantage in that the size of bubbles becomes uniform and dense, but there is a problem in that the surface tension of the super absorbent polymer to be prepared is lowered due to the effect of the foam stabilizer, and the overall absorption properties such as CRC, AUP, and permeability are reduced.

DETAILED DESCRIPTION OF THE INVENTION

Technical Problem

In order to solve the above problems, there is provided a preparation method for a super absorbent polymer capable of achieving an excellent foam stabilizing effect even with a small amount of a foam stabilizer.

Technical Solution

In order to achieve the above object, there is provided a preparation method for a super absorbent polymer including the steps of:

i) mixing an acrylic acid-based monomer having at least partially neutralized acidic groups; an internal cross-linking agent; and a polymerization initiator;

ii) adding a foam stabilizer to the mixture of i) and performing high-shear mixing at a Reynolds number of 10,000 or more;

iii) preparing a monomer composition by adding a foaming agent to the mixture of ii);

iv) preparing a hydrogel polymer by polymerizing the monomer composition; and v) drying, pulverizing, and classifying the hydrogel polymer.

The high-shear mixing may be performed for 10 seconds to 60 seconds.

The high-shear mixing may be performed at a Reynolds number of 10,000 to 20,000.

The content of the foam stabilizer in the monomer composition may be 10 ppm or more and less than 200 ppm.

The content of the foaming agent in the monomer composition may be 100 ppm to 2,000 ppm.

The foaming agent may be at least one selected from the group consisting of sodium bicarbonate, sodium carbonate, potassium bicarbonate, potassium carbonate, calcium bicarbonate, calcium carbonate, magnesium bicarbonate, and magnesium carbonate.

The foam stabilizer may be at least one selected from the group consisting of cationic surfactants, anionic surfactants, amphoteric surfactants and nonionic surfactants.

The foaming agent may be sodium bicarbonate, and the foam stabilizer may be calcium stearate or sodium dodecyl sulfate.

The preparation method may further include a step (vi) of forming a surface cross-linked layer by further cross-linking a surface of the super absorbent polymer obtained in the step v) in the presence of a surface cross-linking agent.

Advantageous Effects

According to the preparation method of the present disclosure, an excellent foam stabilizing effect can be achieved with a small amount of foam stabilizer, and a super absorbent polymer having a large number of small and uniform pores can be obtained without deterioration in physical properties such as surface tension. The super absorbent polymer exhibits a significantly improved absorption rate due to its high surface area, and has excellent absorbent properties such as water retention capacity and absorbency under pressure, so that it can be used in various products requiring high absorbency.

BRIEF DESCRIPTION OF THE DRAWINGS

FIG. 1 shows Sample Dispersion Unit setting values in Morphologi 4 of Malvern Panalytical.

FIG. 2 shows Illumination setting values in Morphologi 4 of Malvern Panalytical.

FIG. 3 shows Optics Selection setting values in Morphologi 4 of Malvern Panalytical.

FIG. 4 shows Scan Area setting values in Morphologi 4 of Malvern Panalytical.

FIG. 5 shows Particle Filtering setting values in Morphologi 4 of Malvern Panalytical.

DETAILED DESCRIPTION OF THE EMBODIMENTS

The terminology used herein is for the purpose of describing particular embodiments only and is not intended to be limiting of the invention. The singular forms are intended to include the plural forms as well, unless the context clearly indicates otherwise. It will be further understood that the terms "include", "comprise", or "have" when used in this disclosure, specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

As used herein, the "base resin" or "base resin powder" is prepared in the form of particles or powder by drying and pulverizing a polymer obtained by polymerization of an acrylic acid-based monomer, and refers to a polymer in which surface modification or surface cross-linking has not been performed.

The preparation method for a super absorbent polymer according to an embodiment of the present disclosure includes the steps of:

i) mixing an acrylic acid-based monomer having at least partially neutralized acidic groups; an internal cross-linking agent; and a polymerization initiator;

ii) adding a foam stabilizer to the mixture of i) and performing high-shear mixing at a Reynolds number of 10,000 or more;

iii) preparing a monomer composition by adding a foaming agent to the mixture of ii);

iv) preparing a hydrogel polymer by polymerizing the monomer composition; and v) drying, pulverizing, and classifying the hydrogel polymer.

When polymerization is performed using a foaming agent to increase the surface area of the super absorbent polymer, a method of using a foam stabilizer is known to prevent loss of bubbles generated from the foaming agent. However, when a large amount of the foam stabilizer is used to sufficiently secure the foam stabilizing effect, there is a problem in that physical properties of the super absorbent polymer are deteriorated.

Therefore, in the present disclosure, in order to obtain a better foam stabilizing effect with a small amount of the foam stabilizer, a super absorbent polymer is prepared by first adding the foam stabilizer to the monomer composition before adding the foaming agent, performing high-shear mixing, and then adding the foaming agent, followed by polymerization. According to this preparation method, gas is generated from the foaming agent while the foam stabilizer is evenly dispersed in the composition, so even a small amount of the foam stabilizer can sufficiently prevent loss of bubbles. Further, since uniform and dense bubbles are generated, a large number of small and uniform pores are formed, making it possible to manufacture a super absorbent polymer with excellent absorption rate.

In addition, the super absorbent polymer prepared according to the above preparation method has particles having a shape close to a sphere, that is, has circularity of a certain level or higher. Further, pores having an appropriate size increase the roughness of the surface of particles and widen the specific surface area, so that the absorption rate and absorption performance can be improved at the same time.

Hereinafter, the preparation method for a super absorbent polymer of the present disclosure will be described in more detail.

First, i) a mixture is prepared by mixing an acrylic acid-based monomer having at least partially neutralized acidic groups; an internal cross-linking agent; and a polymerization initiator.

The acrylic acid-based monomer is a compound represented by the following Chemical Formula 1:

[Chemical Formula 1]

$$R^1\text{—}COOM^1$$

in Chemical Formula 1, $R^1$ is a C2 to C5 alkyl group having an unsaturated bond, and $M^1$ is a hydrogen atom, a monovalent or divalent metal, an ammonium group, or an organic amine salt.

Preferably, the acrylic acid-based monomer may include at least one selected from the group consisting of acrylic acid, methacrylic acid, and a monovalent metal salt, a divalent metal salt, an ammonium salt and an organic amine salt thereof.

Herein, the acrylic acid-based monomers may be those having acidic groups which are at least partially neutralized. Preferably, the acrylic acid-based monomer partially neutralized with an alkali substance such as sodium hydroxide, potassium hydroxide, ammonium hydroxide, or the like may be used. A degree of neutralization of the acrylic acid-based monomer may be 40 to 95 mol %, 40 to 80 wt %, or 45 to 75 mol %. The range of the degree of neutralization can be adjusted according to final properties. An excessively high degree of neutralization causes the neutralized monomers to be precipitated, and thus polymerization may not readily occur. On the contrary, an excessively low degree of neutralization not only deteriorates absorbency of the polymer, but also gives the polymer hard-to-handle properties, such as those of an elastic rubber.

In addition, a concentration of the acrylic acid-based monomer may be about 20 to 60 wt %, preferably about 40 to 50 wt % based on the monomer composition containing the raw materials of the super absorbent polymer and the solvent, and properly controlled in consideration of polymerization time and reaction conditions. When the concentration of the monomer is excessively low, the yield of the super absorbent polymer is low and there may be a problem in economic efficiency. In contrast, when the concentration is excessively high, it may cause problems in processes in that some of the monomer may be extracted or the pulverization efficiency of the polymerized hydrogel polymer may be lowered in the pulverization process, and thus physical properties of the super absorbent polymer may be deteriorated.

The polymerization initiator used during polymerization in the preparation method for a super absorbent polymer of the present disclosure is not particularly limited if it is generally used in the preparation of super absorbent polymers.

Specifically, the polymerization initiator may be an initiator for thermal polymerization or an initiator for photopolymerization by UV radiation according to the polymerization method. However, even when the photopolymerization method is applied thereto, a certain amount heat is generated by UV radiation and the like, and some heat occurs as the polymerization reaction, an exothermal reaction, progresses. Therefore, the composition may additionally include the thermal polymerization initiator.

More specifically, any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, as the specific example of acyl phosphine, commercial Lucirin TPO (Diphenyl(2,4,6-trimethylbenzoyl)phosphine oxide), or Irgacure 819 (Bis(2,4,6-trimethylbenzoyl)phenylphosphine oxide) may be used. More various photoinitiators are well disclosed in "UV Coatings: Basics, Recent Developments and New Application (Elsevier, 2007)" written by Reinhold Schwalm, p 115, and the present disclosure is not limited thereto.

The photoinitiator may be contained in an amount of 0.001 parts by weight or more and 0.1 parts by weight or less based on 100 parts by weight of the acrylic acid-based monomer. When the content of the photoinitiator is too low, the polymerization rate may become slow, and when the content of the photoinitiator is too high, the molecular weight of the super absorbent polymer may become low and properties may be uneven.

In addition, as the thermal polymerization initiator, at least one selected from the initiator group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate ($(NH_4)_2S_2O_8$), and the like may be used as examples of the persulfate-based initiator; and 2,2-azobis-(2-amidinopropane) dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane]dihydrochloride, 4,4-azobis-(4-cyanovaleric acid), and the like may be used as examples of the azo-based initiator. More various thermal polymerization initiators are well disclosed in "Principle of Polymerization (Wiley, 1981)" written by Odian, p 203, and the present disclosure is not limited thereto.

The thermal initiator may be contained in an amount of 0.01 parts by weight or more, and 1 parts by weight or less based on 100 parts by weight of the acrylic acid-based monomer. When the content of the thermal initiator is less than 0.01 parts by weight based on 100 parts by weight of the acrylic acid-based monomer, the polymerization rate may become slow. When it exceeds 1 parts by weight, the molecular weight of the polymer to be prepared is small and the gel sheet becomes sticky, so there may be a problem in productivity.

The monomer composition according to an embodiment of the present disclosure contains an internal cross-linking agent. The internal cross-linking agent is used for cross-linking the inside of the polymer in which the acrylic acid monomer is polymerized, and is distinguished from a surface cross-linking agent for cross-linking the surface of the polymer.

For example, the internal cross-linking agent may be at least one selected from the group consisting of N,N'-methylenebisacrylamide, trimethylolpropane tri(meth)acrylate, ethylene glycol di(meth)acrylate, (meth)acrylate, propylene glycol di(meth)acrylate, polyethylene glycol di(meth)acrylate, polypropylene glycol (meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentaacrylate, glycerin tri(meth)acrylate, pentaerythritol tetraacrylate, triarylamine, ethylene glycol diglycidyl ether, propylene glycol, glycerin, and ethylene carbonate.

The internal cross-linking agent may be contained in an amount of 0.01 parts by weight or more, 0.05 parts by weight or more, 0.1 parts by weight or more, or 0.5 parts by weight or more, and 2 parts by weight or less, 1.5 parts by weight or less, or 1 parts by weight or less based on 100 parts by weight of acrylic acid.

Meanwhile, any solvent which can dissolve the components included in the monomer composition such as an acrylic acid-based monomer, an internal cross-linking agent, a polymerization initiator, a foam stabilizer, a foaming agent, and optional additives may be used without limitation as the solvent used in preparing the mixture and monomer composition in steps i) to iii). For example, the solvent may be in combination of at least one selected from water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, and N,N-dimethylacetamide.

The method for preparing the mixture of step i) is not particularly limited. For example, the mixture of step i) may be prepared by mixing an acrylic acid-based monomer, an internal cross-linking agent, and a polymerization initiator, and adding a basic solution in which an alkaline material such as sodium hydroxide is dissolved to partially neutralize the acidic groups of the acrylic acid-based monomer. Alternatively, the mixture of step i) may be prepared by first neutralizing the acrylic acid-based monomer with an alkaline material and then mixing it with an internal cross-linking agent and a polymerization initiator. However, this is only an example, and the order of adding each raw material and the mixing method are not particularly limited.

Subsequently, ii) a foam stabilizer is added to the mixture of i), and high-shear mixing is performed at a Reynolds number of 10,000 or more to evenly disperse the foam stabilizer in the mixture.

The foam stabilizer is a material that prevents bubbles generated from the foaming agent from escaping to the outside of the monomer composition and helps the bubbles to be generated more uniformly and densely. A material generally known in the art as a foam stabilizer or a surfactant may be used.

For example, one or more surfactants selected from the group consisting of cationic surfactants, anionic surfactants, amphoteric surfactants, and nonionic surfactants may be used as the foam stabilizer.

For example, examples of the cationic surfactant include dialkyldimethylammonium salt, alkylbenzylmethylammonium salt, and the like. Examples of the anionic surfactant include fatty acid metal salt, alkyl polyoxyethylene sulfate, monoalkyl sulfate, alkylbenzene sulfonate, monoalkyl phosphate, and the like. Examples of the amphoteric surfactant include alkylsulfobetaine, alkylcarboxybetaine, and the like. Examples of the nonionic surfactant include polyoxyethylene alkyl ether, polyoxyalkylene alkyl phenyl ether, polyoxyethylene arylphenyl ether, fatty acid sorbitan ester, alkyl monoglyceryl ether, alkanol amide, alkyl polyglucoside, and the like. Moreover, polyalkylene glycol, polyethyleneimide, polyvinyl alcohol, polyacrylamide, polyvinylpyrrolidone, and the like can be used as a polymeric surfactant.

In addition, hydrophobic particles may be used as the foam stabilizer, and the hydrophobic particles may be a metal salt of a C12 to C20 saturated fatty acid. For example, the hydrophobic particles may be at least one metal salt of a saturated fatty acid selected from the group consisting of a metal salt of lauric acid containing 12 carbon atoms in the molecule; a metal salt of tridecyl acid containing 13 carbon atoms in the molecule; a metal salt of myristic acid containing 14 carbon atoms in the molecule; a metal salt of pentadecanoic acid containing 15 carbon atoms in the molecule; a metal salt of palmitic acid containing 16 carbon atoms in the molecule; a metal salt of margaric acid containing 17 carbon atoms in the molecule; a metal salt of stearic acid containing 18 carbon atoms in the molecule; a metal salt of nonadecylic acid containing 19 carbon atoms in the molecule; and a metal salt of arachidic acid containing 20 carbon atoms in the molecule. In the metal salt of the saturated fatty acid, the metal may be calcium, zinc, potassium, sodium, magnesium, or the like.

For example, an anionic surfactant may be used as the foam stabilizer, and preferably, a fatty acid metal salt or a monoalkyl sulfate may be used. Preferably, a metal salt of a saturated fatty acid having 12 to 20 carbon atoms (e.g., calcium stearate, etc.), sodium dodecyl sulfate, and the like can be used as the foam stabilizer.

The foam stabilizer is preferably used in an amount of less than 200 ppm, less than 150 ppm, or less than 100 ppm, and 10 ppm or more, or 20 ppm or more based on the total weight of the monomer composition to be finally prepared. In general, in order to obtain a sufficient foam stabilizing effect, 200 ppm or more of a foam stabilizer is used. However, in the present disclosure, high-shear mixing is performed at a Reynolds number of 10,000 or more after the addition of the foam stabilizer, so that an excellent foam stabilizing effect can be obtained even with less than 200 ppm of the foam stabilizer. If the content of the foam stabilizer is too small, less than 10 ppm, the effect by using the foam stabilizer cannot be obtained, so it is preferable that the above range is satisfied.

The high-shear mixing after adding the foam stabilizer is performed so that the Reynold's number (Re) of the mixture is 10,000 or more, 13,000 or more, or 15,000 or more.

The Reynolds number is the ratio between inertial and viscous forces of fluids, and is represented by the Equation 1 below.

$$Re = (\rho \times v_s \times L)/\mu \quad \text{[Equation 1]}$$

In Equation 1, ρ is the density of the fluid, $v_s$ is the mean velocity of the fluid, L is the characteristic length, and ρ is the viscosity of the fluid.

In the present disclosure, the characteristic length is a diameter of the vessel in which the mixing in step ii) is performed. The viscosity of the fluid, that is, the mixture to which the foam stabilizer is added, is a viscosity at the high-shear mixing temperature (e.g., 45° C. to 50° C.), and can be measured with a viscometer (e.g., Brookfield viscometer LVDV-I Prime) under conditions of spindle number S63 and rotational speed of 1000 rpm. The density of the fluid can be calculated from the weight and volume of the mixture.

In the present disclosure, after adding the foam stabilizer, the mixture is mixed with high shear at a Reynolds number of 10,000 or more to evenly disperse the foam stabilizer in the mixture, so that a sufficient foam stabilizing effect can be obtained even with a small amount of the foam stabilizer. The Reynolds number of the mixture during high-shear mixing can be calculated through the above Equation. More simply, as described in Chemical Engineering and Processing 57-58 (2012) 25-41, measuring the power draw of the high-shear mixer can predict when the Reynolds number will reach 10,000. That is, when the power draw is measured while increasing the rpm of the high-shear mixer, the power draw no longer increases above a certain rpm, and at this time, the Reynolds number is 10,000 or more.

Meanwhile, when the Reynolds number is 4,000 or more, the nature of the flow can be generally regarded as turbulent flow. However, even if turbulent flow occurs, when the Reynolds number is less than 10,000, the foam stabilizer is not sufficiently dispersed in the mixture, so that the desired effect cannot be achieved. Therefore, the Reynolds number is set to 10,000 or more during the high-shear mixing, so that the foam stabilizer is mixed in a completely turbulent flow state.

Meanwhile, the higher Reynolds number during the mixing can be evaluated as the better. Thus, the upper limit is not theoretically limited, but may be, for example, 20,000 or less.

The high-shear mixing time may be appropriately adjusted according to the composition of the mixture, and may be, for example, 10 seconds or more, or 20 seconds or more, and 60 seconds or less, 50 seconds, or 40 seconds or less. When the high-shear mixing time is less than 10 seconds, sufficient mixing cannot be performed, and when mixing is performed for an excessively long time exceeding 60 seconds, there may be a problem in that too much air is mixed into the neutralized solution, which may slow down the polymerization rate.

The high-shear mixing may be performed using a commercially available high-shear mixer such as an in-line high shear mixer, a high shear batch mixer, or a homogenizer.

Subsequently, iii) a final monomer composition is prepared by adding a foaming agent to the mixture of ii) after the high-shear mixing.

As the foaming agent, inorganic foaming agents commonly used in the preparation of a super absorbent polymer may be used without limitation, and for example, a carbonate-based foaming agent may be used.

For example, the carbonate-based foaming agent may be at least one selected from the group consisting of sodium bicarbonate, sodium carbonate, potassium bicarbonate, potassium carbonate, calcium bicarbonate, calcium bicarbonate, magnesium bicarbonate and magnesium carbonate, but the present disclosure is not limited thereto.

The foaming agent may be used in an amount of 100 ppm or more, 300 ppm or more, or 400 ppm or more, and 2,000 ppm or less, 1,500 ppm or less, or 1,000 ppm or less based on the total weight of the monomer composition to be finally prepared. When the content of the foaming agent is too low, the super absorbent polymer to be prepared may not have sufficient porosity due to insufficient bubbles during polymerization. When the content of the foaming agent is too high, porosity of the super absorbent polymer may be excessively high, and thus there may be a problem in that mechanical strength is lowered.

When adding the foaming agent, stirring may be performed using a magnetic stirrer or the like to uniformly disperse the foaming agent. At this time, the stirring speed may be, for example, 50 rpm or more, 100 rpm or more, or 150 rpm or more, and 500 rpm or less, 400 rpm or less, or 300 rpm or less, and the stirring time may be, for example, 1 second to 30 seconds, or 5 seconds to 20 seconds.

The monomer composition may further include an additive such as a thickener, a plasticizer, a preservation stabilizer, and an antioxidant, if necessary. This additive may be suitably added in at least one of steps i) to iii), and is preferably added when the foam stabilizer is added in step i) or step ii).

Subsequently, iv) a hydrogel polymer is formed by thermal polymerization or photopolymerization of the monomer composition.

In the case of thermal polymerization, it is generally carried out in a reactor equipped with an agitation spindle, such as a kneader. In addition, the thermal polymerization may be performed at a temperature of about 80° C. or higher and less than about 110° C. so that the internal cross-linking agent is not decomposed by heat. The heating means for the above-described polymerization temperature is not particularly limited, and heating may be performed by supplying a heat medium to the reactor or by directly supplying a heat source. At this time, usable thermal media may be a heated fluid such as steam, hot air, hot oil, and the like, but the present invention is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present disclosure is not limited thereto. When thermal polymerization is performed using a reactor having the agitation spindle, a hydrogel polymer having a size of several centimeters to several millimeters may be obtained depending on a shape of the agitation spindle provided in the reactor. Specifically, a shape of the hydrogel polymer obtained may vary depending on the concentration and injection rate of the monomer composition to be injected.

Meanwhile, in the case of photopolymerization, it may be carried out in a reactor equipped with a movable conveyor belt. However, the above polymerization method is an example, and the present disclosure is not limited thereto. When the polymerization is performed in the reactor as described above, a hydrogel polymer in the form of a sheet having a belt width may be obtained. A thickness of the hydrogel polymer sheet may vary depending on the concentration and injection rate of the monomer composition to be injected, and it is preferable to supply the monomer composition so that the polymer in the form of a sheet has a thickness of about 0.5 to about 5 cm. When the monomer composition is supplied to such an extent that the thickness of the polymer sheet is too thin, the production efficiency may be low. When the thickness of the polymer sheet exceeds 5 cm, the polymerization reaction may not occur evenly over the entire thickness due to the excessively thick thickness.

The polymerization temperature of the monomer composition is not particularly limited, but may be, for example, 80 to 120° C., preferably 90 to 110° C. In addition, the polymerization time of the monomer composition is not particularly limited and may be adjusted to about 30 seconds to 60 minutes.

Generally, the moisture content of the hydrogel polymer may be about 40 to about 80 wt %. At this time, "moisture content" in the present disclosure is the content of moisture in the entire weight of the polymer, and it means a value of which the weight of the dried polymer is subtracted from the weight of the polymer. Specifically, the moisture content is defined as a value calculated by measuring the weight loss due to moisture evaporation from the polymer in the process of increasing the temperature of the polymer for drying through infrared heating. At this time, the drying condition for measuring the moisture content is as follows: the temperature is increased to about 180° C. and maintained at 180° C., and the total drying time is 20 minutes including 5 minutes of a heating step.

Subsequently, a step v) of drying, pulverizing, and classifying the hydrogel polymer is performed.

If necessary, coarse pulverization may be further performed before drying to increase the efficiency of the drying step.

At this time, there is no limitation in the configuration of the pulverizing machine used. Specifically, at least one pulverizing machine selected from the group consisting of a vertical pulverizer, a turbo cutter, a turbo grinder, a rotary cutter mill, a cutter mill, a disc mill, a shred crusher, a crusher, a chopper and a disc cutter may be used, but the present disclosure is not limited thereto.

In the pulverization step, the hydrogel polymer may be pulverized so that the particle diameter is about 2 to about 10 mm.

Pulverization to a particle diameter of less than 2 mm is not technically easy due to the high moisture content of the hydrogel polymer, and a phenomenon of agglomeration between the pulverized particles may occur. On the other hand, when pulverized to a particle diameter of more than 10 mm, the effect of increasing the efficiency of the subsequent drying step is insignificant.

Drying is performed on the hydrogel polymer that has been pulverized as described above or immediately after polymerization without the pulverization step. The drying temperature in the drying step may be about 150 to about 250° C. When the drying temperature is less than 150° C., the drying time may become excessively long and physical properties of the super absorbent polymer to be finally formed may decrease. When the drying temperature is more than 250° C., only the surface of the polymer is excessively dried, fine powder may be generated in the subsequent pulverization process, and physical properties of the final super absorbent polymer may decrease. Therefore, the drying may preferably be performed at a temperature of about 150 to about 200° C., more preferably at a temperature of about 160 to about 180° C.

Meanwhile, the drying time may be about 20 minutes to about 90 minutes in consideration of process efficiency, but is not limited thereto.

The drying method in the drying step is not particularly limited if it has been generally used in the drying process of the hydrogel polymer. Specifically, the drying step may be performed by the method of hot air provision, infrared radiation, microwave radiation, UV ray radiation, and the like. After the drying step, the moisture content of the polymer may be about 0.1 to about 10 wt %.

Subsequently, a step of pulverizing the dried polymer obtained through the drying step is performed.

The polymer powder obtained after the pulverization step may have a particle diameter of about 150 to about 850 μm. As the pulverizing machine used for pulverization to such a particle diameter, a pin mill, a hammer mill, a screw mill, a roll mill, a disc mill, a jog mill, or the like may be used, but the present disclosure is not limited thereto.

In addition, a separate process of classifying the polymer powder obtained after the pulverization step according to particle size may be performed, and the polymer powder may be classified in a predetermined weight ratio according to the particle size.

Pulverization and classification of the dried polymer may be performed, for example, according to the following method. First, the dried polymer is firstly pulverized using a pulverizing machine such as a cutting mill, and then the pulverized polymer is classified using a classifier such as a sieve shaker. The particles of 20 mesh or more obtained after the classification (particles having a diameter of 841 μm or more) are put into the pulverizing machine again, pulverized secondly, and then classified. This pulverization and classification method is described in more detail in the following Examples. However, the pulverization and classification methods in the preparation method of the present disclosure are not limited to the above examples, and various pulverization and classification methods used in the art of the present disclosure may be applied.

Meanwhile, in order to form a surface cross-linked layer on the super absorbent polymer in which the drying, pulverization, and classification have been completed, that is, the base resin, a step of vi) further cross-linking a surface of the base resin in the presence of a surface cross-linking agent is additionally performed.

Specifically, a surface cross-linking agent is mixed with the base resin, and then heat is applied to the mixture to perform a surface cross-linking reaction on the pulverized polymer.

The surface cross-linking step is a step of inducing a cross-linking reaction on the surface of the base resin in the presence of a surface cross-linking agent, thereby forming a super absorbent polymer having improved physical properties. Through the surface cross-linking, a surface cross-linked layer (surface-modified layer) is formed on the surface of the base resin.

The surface cross-linking agent is applied on the surface of super absorbent polymer particles. Therefore, surface cross-linking reactions occur on the surface of the super absorbent polymer particles, which improves cross-linkability on the surface of the particles without substantially affecting the inside of the particles. Thus, the surface cross-linked super absorbent polymer particles have a higher degree of cross-linking at the surface than inside.

Meanwhile, as the surface cross-linking agent, a compound capable of reacting with a functional group of the polymer is used. For example, a polyalcohol-based compound, a polyepoxy-based compound, a polyamine compound, a haloepoxy compound, a condensation product of a haloepoxy compound, an oxazoline-based compound, or an alkylene carbonate-based compound may be used.

Specifically, as the polyalcohol-based compound, at least one selected from the group consisting of di-, tri-, tetra- or polyethylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexane dimethanol may be used.

In addition, as the polyepoxy-based compound, ethylene glycol diglycidyl ether, polyethylene glycol diglycidyl ether, or glycidol may be used. As the polyamine compound, at least one selected from the group consisting of ethylenediamine, diethylenetriamine, triethylenetetraamine, tetraethylenepentamine, pentaethylenehexamine, polyethyleneimine and polyamide polyamine may be used.

Further, as the haloepoxy compound, epichlorohydrin, epibromohydrin, or α-methylepichlorohydrin, may be used. Meanwhile, as the mono-, di-, or polyoxazolidinone compound, 2-oxazolidinone may be used.

In addition, as the alkylene carbonate-based compound, ethylene carbonate or the like may be used.

The surface cross-linking agents may be used alone or in combination with each other.

The content of the surface cross-linking agent added may be appropriately selected depending on the type of the added surface cross-linking agent or reaction conditions, and may be about 0.001 to about 5 parts by weight, preferably about 0.01 to about 3 parts by weight, more preferably about 0.05 to about 3 parts by weight based on 100 parts by weight of the base resin.

When the content of the surface cross-linking agent is too low, the surface cross-linking reaction hardly occurs. When the content of the surface cross-linking agent exceeds 5 parts by weight based on 100 parts by weight of the polymer, absorption properties such as water retention capacity may be deteriorated due to the excessive surface cross-linking reaction.

In addition, the method of adding the surface cross-linking agent to the base resin powder is not particularly limited. For example, a method of adding the surface cross-linking agent and the base resin powder in a reactor for mixing, a method of spraying the surface cross-linking agent onto the base resin powder, or a method of mixing the base resin powder and the surface cross-linking agent while continuously providing them to a continuously operating mixer may be used.

When adding the surface cross-linking agent, water may be additionally mixed and added in the form of a surface cross-linking solution. When water is added thereto, there is an advantage that the surface cross-linking agent may be evenly dispersed in the polymer. At this time, amounts of water to be added may be properly controlled for the purposes of inducing a uniform dispersion of the surface cross-linking agent, preventing an agglomeration phenomenon of the polymer powder, and optimizing a surface penetration depth of the surface cross-linking agent. For example, water may preferably be added in an amount of about 1 to about 10 parts by weight based on 100 parts by weight of the base resin.

Meanwhile, the surface modification is performed on the base resin by heating the mixture of the base resin and the surface cross-linking solution to increase the temperature.

The surface modification may be performed under well-known conditions depending on the type of the surface cross-linking agent, for example, may be performed at a temperature of 100 to 200° C. for 20 to 60 minutes. In a more specific embodiment, when the surface cross-linking agent is a polyvalent epoxy-based compound, it may be performed by heating for about 10 to about 50 minutes, or about 15 to about 40 minutes at a temperature of about 120 to about 180° C., or about 120 to about 150° C. When the temperature of the surface modification is less than 100° C., or the reaction time is too short, the surface cross-linking reaction does not occur properly and transmittance may be lowered. When the temperature exceeds 200° C., or the reaction time is too long, a problem of lowering water retention capacity may occur.

The heating means for the surface cross-linking reaction is not particularly limited. It is possible to provide a thermal media thereto or provide a heat source directly thereto. At this time, usable thermal media may be a heated fluid such as steam, hot air, hot oil, and the like, but the present invention is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present disclosure is not limited thereto.

After the surface modification, a process of classifying the obtained super absorbent polymer powder according to particle size may be additionally performed.

According to the above preparation method, an excellent foam stabilizing effect can be achieved even with a small amount of the foam stabilizer, and thus, a super absorbent polymer having a large number of small and uniform pores can be obtained. Thus, the super absorbent polymer has excellent absorption rate, and physical properties such as surface tension are not deteriorated.

For example, the super absorbent polymer prepared according to the preparation method may have a vortex time (absorption rate) of 45 seconds or less, 42 seconds or less, 38 seconds or less, or 35 seconds or less. As the lower vortex time can be evaluated as the better, the lower limit is theoretically 0 seconds, but may be 5 seconds or more, 10 seconds or more, or 12 seconds or more. The absorption rate measurement method may be more specifically described in Examples described below.

In addition, the super absorbent polymer prepared according to the above preparation method exhibits a high specific surface area as the particles have a shape close to a sphere and contain small and uniform pores, thereby exhibiting excellent absorption rate and absorption performance at the same time.

Specifically, the super absorbent polymer prepared according to the above preparation method may have an average value of circularity of 0.75 or more calculated by the following Equation 2, and an average value of convexity of 0.9 or less calculated by the following Equation 3, when measured for particles having a particle diameter of 300 μm to 600 μm:

Circularity = circle equivalent perimeter/actual particle perimeter [Equation 2]

Convexity = convex hull perimeter/actual particle perimeter [Equation 3]

in Equations 2 and 3, the actual particle perimeter is an actual perimeter of a projection image obtained by capturing a 3D image of a 3D particle to be measured as a 2D image, when assuming that there is a circle with an area equal to that of a projection image obtained by capturing a 3D image of a 3D particle to be measured as a 2D image, the circle equivalent perimeter is a perimeter of the corresponding particle, and the convex hull perimeter is a length of an elastic band when assuming that a projection image obtained by capturing a 3D image of a 3D particle to be measured as a 2D image is surrounded by an imaginary elastic band extending around the outline.

The circularity is a parameter for determining how close a particle is to a perfect circle, and calculated as a ratio of the circle equivalent perimeter to the actual particle perimeter (Equation 2 above).

Therefore, the closer the circularity is to 1, the closer the 2D shape of the particle is to a circular shape. The farther away the circularity is from 1, the farther away the 2D shape of the particle is from a perfect circle. In the case of the aspect ratio, both circles and squares can have a value of 1, but in the case of the circularity, a value of 1 can only be obtained when the 2D shape of the particle is a perfect circle.

At this time, the average value of circularity is measured after being scattered on a stage in an arbitrary method by a vacuum in the measuring device, and obtained as a statistical result by securing a sample size (n) of 200 or more and averaging them.

In addition, the convexity is a parameter for measuring an outline and surface roughness of a particle, and is calculated by the following Equation 3:

Accordingly, the convexity has a value of 0 to 1. As the convexity is closer to 1, the particle can be considered to have a very smooth outline, and as the convexity is closer to 0, the particle can be considered to have a rough or uneven outline.

At this time, an average value of convexity is also measured after being scattered on a stage in an arbitrary method by a vacuum in the measuring device in the same manner as in the average value of the circularity, and obtained as a statistical result by securing a sample size (n) of 200 or more and averaging them.

Meanwhile, the circularity and convexity can be measured using various commercial instruments that quantify and analyze the morphology of particles based on image analysis of the particles. As an example, the parameters may be measured with Morphologi 4 manufactured by Malvern Panalytical, and specifically by the following 4 steps, which will be described in more detail in the following experimental examples.

1) Sample preparation: A sample having a particle diameter of 300 μm to 600 μm is prepared by classifying a super absorbent polymer at 1.0 amplitude for 10 minutes using a particle classifier (e.g., sieve shaker manufactured by Retsch). At this time, the particle diameter of the super absorbent polymer may be measured in accordance with the EDANA (European Disposables and Nonwovens Association) WSP 220.3.

2) Image capture: The prepared sample is set on a stage in the instrument, and scanned at 2.5 magnification to capture images of individual particles.

3) Image processing: For the captured images, parameter values such as the projection image obtained by capturing a 3D image of the 3D particle as a 2D image, circle equivalent diameter, shortest diameter, longest diameter, actual particle perimeter, circle equivalent perimeter and convex hull perimeter are measured for each particle.

4) A distribution of each parameter for all particles included in the sample is derived based on the analyzed data for each particle.

When the average value of circularity of the particles having a particle size of 300 μm to 600 μm in the super absorbent polymer is less than 0.75, the particles do not have a spherical shape, so the absorption rate is fast, but the balance between water retention capacity and absorbency under pressure may be deteriorated. When the average value of convexity of the particles having a particle size of 300 μm to 600 μm in the super absorbent polymer exceeds 0.9, the pore structure in the particles is not developed or has a smooth surface, thereby reducing the absorption rate of the super absorbent polymer. Therefore, when the particles having a particle size of 300 μm to 600 μm in the super absorbent polymer have an average value of circularity of 0.75 or more and simultaneously satisfy an average value of convexity of 0.90 or less, it is possible to provide a super absorbent polymer having an excellent balance between the absorption rate and absorption performance.

More specifically, the average value of circularity measured for particles having a particle diameter of 300 μm to 600 μm of the super absorbent polymer prepared according to an embodiment of the present disclosure may be 0.75 or more, and 0.90 or less, 0.85 or less, or 0.83 or less. In addition, the super absorbent polymer may have the average value of convexity measured for particles having a particle diameter of 300 μm to 600 μm of 0.7 or more, 0.8 or more, or 0.85 or more, and 0.9 or less.

In addition, the super absorbent polymer satisfies the aforementioned ranges of circularity and convexity, and has a vortex time of 45 seconds or less, 42 seconds or less, 38 seconds or less, or 35 seconds or less, and 0 seconds or more, 5 seconds or more, 10 seconds or more, or 12 seconds or more.

Hereinafter, the present invention will be described in more detail with the following preferred examples, but these examples are provided for illustrative purposes only. It is apparent to those skilled in the art that various changes and modifications can be made within the scope and spirit of the present invention. Therefore, it is obvious that the changes and modifications are within the scope of the present invention.

EXAMPLES

Example 1

In a 3 L glass container equipped with a stirrer and a thermometer, 100 g of acrylic acid, 0.5 g of PEGDA 400 (polyethylene glycol diacrylate 400) as an internal cross-linking agent, and 0.01 g of diphenyl(2,4,6-trimethylbenzoyl)-phosphine oxide as a photoinitiator were added and dissolved. Then, 890 g of 22% sodium hydroxide solution was added to prepare an aqueous monomer solution.

Sodium dodecyl sulfate (SDS) was added as a foam stabilizer to the aqueous monomer solution, and high-shear mixing was performed at a Reynolds number of 10,000 for 30 seconds using an in-line type high shear mixer (Silverson, L5M-A). During the high-shear mixing, the viscosity of the mixture at 45° C. was confirmed to be 10 cP. Thereafter, the high-shear mixing was stopped, solid sodium bicarbonate (SBC) was added as a foaming agent, and a final monomer composition was prepared by stirring at 250 rpm for 5 seconds using a magnetic stirrer (IKA, C-MAG HS7). In the above, SDS was added in an amount of 20 ppm and SBC was added in an amount of 1,000 ppm based on the total amount of the final monomer composition.

The monomer composition was poured into a Vat-type tray (15 cm wide×15 cm long) installed in a square polymerizer, wherein the polymerizer was provided with a light irradiation device on the top and preheated to 80° C., and then light irradiation was performed to initiate polymerization. After light irradiation for 60 seconds, reaction was further conducted for 120 seconds to obtain a hydrogel polymer in the form of a sheet.

150 g of water was evenly sprayed on 1500 g of the hydrogel polymer for lubrication, and then pulverized with a chopper having a 10 mm hole plate. The pulverized hydrogel polymer was dried in a dryer capable of changing wind direction up and down. The hydrogel polymer was uniformly dried by flowing hot air at 180° C. from the bottom to the top for 15 minutes, and then flowing from the top to the bottom for 15 minutes, so that the moisture content of the dried powder was about 2% or less.

Next, the base resin was pulverized once using Pulverisette 19 from Fritsch equipped with a 12 mm screen mesh inside. Then, the pulverized base resin was classified at 1.0 amplitude for 10 minutes using a Sieve shaker from Retsch. Thereafter, only for the obtained particles of 20 mesh or more (particle diameter of 841 μm or more), pulverization was performed once more with the Pulverisette 19 using a 1 mm screen mesh. Thereafter, the pulverized super absorbent polymer was further classified at 1.0 amplitude for 10 minutes using the Sieve shaker. The particles obtained by the first pulverization and classification and the particles obtained by the second pulverization and classification were combined to form a base resin (particle diameter of 150 μm to 850 μm).

Then, 6 parts by weight of a surface cross-linking aqueous solution containing 3 parts by weight of ethylene carbonate was sprayed to 100 parts by weight of the obtained base resin powder, and stirred at room temperature to evenly distribute the surface cross-linking solution on the base resin powder. Then, the base resin powder mixed with the surface cross-linking solution was placed in a surface cross-linking reactor, and a surface cross-linking reaction was performed.

In this surface cross-linking reactor, it was confirmed that the base resin powder was gradually heated from the initial temperature of around 80° C., and it was operated to reach the maximum reaction temperature of 190° C. after 30 minutes. After reaching the maximum reaction temperature, the reaction was further performed for 15 minutes, and a sample of the finally prepared super absorbent polymer was taken. After the surface cross-linking process, the super absorbent polymer of Example 1 having a particle diameter of 150 mu to 850 mu was prepared by classification with a ASTM standard mesh.

Example 2

A super absorbent polymer was prepared in the same manner as in Example 1, except that calcium stearate (Ca-st) having a particle size of 5 μm was added in an amount of 100 ppm based on the total amount of the final monomer composition instead of SDS as a foam stabilizer.

Example 3

A super absorbent polymer was prepared in the same manner as in Example 1, except that the amount of SBC added was 500 ppm based on the total amount of the final monomer composition.

Example 4

A super absorbent polymer was prepared in the same manner as in Example 2, except that the amount of SBC added was 400 ppm based on the total amount of the final monomer composition.

Comparative Example 1

1,000 ppm of SDS and 200 ppm of SBC were simultaneously added to the aqueous monomer solution prepared in the same manner as in Example 1 based on the total amount of the final monomer composition, and stirred at 250 rpm for 30 seconds instead of high-shear mixing to prepare a monomer composition. Thereafter, polymerization, drying, pulverization, classification, and surface cross-linking processes were performed in the same manner as in Example 1 to prepare a super absorbent polymer.

Comparative Example 2

A super absorbent polymer was prepared in the same manner as in Comparative Example 1, except that calcium stearate (Ca-st) having a particle size of 5 μm was added in an amount of 1,000 ppm based on the total amount of the final monomer composition instead of SDS as a foam stabilizer.

Comparative Example 3

A super absorbent polymer was prepared in the same manner as in Example 1, except that SBC was added simultaneously with SDS, followed by high-shear mixing.

Comparative Example 4

A super absorbent polymer was prepared in the same manner as in Example 2, except that SBC was added simultaneously with Ca-st, followed by high-shear mixing.

Comparative Example 5

A super absorbent polymer was prepared in the same manner as in Example 1, except that stirring was performed at 250 rpm for 30 seconds using a magnetic stirrer instead of the high-shear mixing after adding SDS.

Comparative Example 6

A super absorbent polymer was prepared in the same manner as in Example 1, except that high-shear mixing was performed for 30 seconds at a Reynolds number of 5,000 after adding SDS.

Experimental Examples

The physical properties of the super absorbent polymers prepared in Examples and Comparative Examples were measured by the following method, and the results are summarized in Table 1.

(1) Vortex Time (Absorption Rate, See)

The vortex time was measured according to the Japanese standard method (JIS K 7224). Specifically, 50 mL of saline (0.9 wt % sodium chloride aqueous solution) at 24° C. and a magnetic bar (8 mm in diameter, 31.8 mm in length) were put into a 100 ml beaker, and stirred at 600 rpm. 2.0 g of a super absorbent polymer was added to the stirring saline, and the time taken until the vortex disappeared was measured in seconds to calculate the vortex time.

(2) Centrifugal Retention Capacity (CRC)

The centrifugal retention capacity of each polymer was measured according to the EDANA WSP 241.3.

After inserting W0 (g, 0.2 g) of the super absorbent polymer uniformly in a nonwoven fabric envelope and sealing the same, it was soaked in saline (0.9 wt %) at room temperature. After 30 minutes, the envelope was centrifuged at 250 G for 3 minutes to drain, and the weight W2 (g) of the envelope was measured. Further, after carrying out the same operation without using the polymer, the weight W1 (g) of the envelope was measured. Then, CRC (g/g) was calculated by using the obtained weight values according to the following Equation.

$$CRC(g/g) = \{[W2(g) - W1(g)]/W0(g)\} - 1$$

(3) Absorbency Under Pressure at 0.7 Psi (0.7 AUP)

The absorbency under pressure at 0.7 psi of each polymer was measured according to the EDANA WSP 242.3.

A 400 mesh stainless steel screen was installed in a cylindrical bottom of a plastic having an inner diameter of 60 mm. W0 (g, 0.90 g) of the super absorbent polymer was uniformly scattered on the screen at room temperature and a humidity of 50%. Thereafter, a piston which can uniformly provide a load of 0.7 psi was placed thereon. Herein, the outer diameter of the piston was slightly smaller than 60 mm, there was no gap with the inner wall of the cylinder, and jig-jog of the cylinder was not interrupted. At this time, the weight W3 (g) of the device was measured.

Subsequently, a glass filter having a diameter of 90 mm and a thickness of 5 mm was placed in a petri dish having a diameter of 150 mm, and saline composed of 0.9 wt % sodium chloride was poured in the dish. At this time, the saline was poured until the surface level of the saline became equal to the upper surface of the glass filter. One sheet of filter paper with a diameter of 90 mm was placed thereon. After the measuring device was placed on the filter paper, the liquid was absorbed for 1 hour under a load. After 1 hour, the measuring device was lifted, and the weight W4 (g) was measured.

Then, absorbency under pressure (g/g) was calculated by using the obtained weight values according to the following Equation.

$$AUP(g/g) = [W5(g) - W4(g)]/W3(g)$$

(4) Surface Tension (S/T)

The surface tension of the super absorbent polymers of Examples and

Comparative Examples was Measured as Follows

① First, 40 g of saline composed of 0.9 wt % sodium chloride was added to a 50 mL beaker, and stirred at 350 rpm for 3 minutes.

② Subsequently, 0.5 g of the super absorbent polymer was added to the stirring solution, stirred for another 3 minutes, and then allowed to stand for 2 minutes so that the swollen super absorbent polymer settled on the bottom.

③ Thereafter, the supernatant (the solution immediately below the surface) was extracted with a pipette, and transferred to another clean cup to measure the surface tension using a surface tension meter (Force Tensiometer—K11/K100, manufactured by Kruss).

(5) Measurement of Shape Parameters of Super Absorbent Polymer Particles

The circularity and convexity were measured for the super absorbent polymers of Examples and Comparative Examples with Morphologi 4 manufactured by Malvern Panalytical in the following method.

① Sample preparation: The super absorbent polymer was classified at 1.0 amplitude for 10 minutes using a sieve shaker from Retsch to prepare 1 g of a sample having an individual particle diameter of 300 μm to 600 μm. FIG. 1 shows Sample Dispersion Unit setting values at this time.

② Image capture: The prepared sample was set on a stage in the instrument, and scanned at 2.5 magnification to capture projection images of individual particles. At this time, Illumination setting value and Optics Selection setting value are shown in FIGS. 2 and 3, respectively.

③ Image processing: For the captured images, parameter values such as the projection image obtained by capturing a 3D image of the 3D particle as a 2D image, circle equivalent diameter, shortest diameter, longest diameter, actual particle perimeter, circle equivalent perimeter and convex hull perimeter were measured for each particle. At this time, Scan Area setting value and Particle Filtering setting value are shown in FIGS. 4 and 5, respectively.

④ A distribution of each parameter for all particles included in the sample was derived based on the analyzed data for each particle.

The circularity and convexity were calculated by Equations 2 and 3, respectively.

Circularity = circle equivalent perimeter/actual particle perimeter [Equation 2]

Convexity = convex hull perimeter/actual paricle perimeter [Equation 3]

in the Equations 2 and 3, the actual particle perimeter is an actual perimeter of a projection image obtained by capturing a 3D image of a 3D particle to be measured as a 2D image, when assuming that there is a circle with an area equal to that of a projection image obtained by capturing a 3D image of a 3D particle to be measured as a 2D image, the circle equivalent perimeter is a perimeter of the corresponding particle, and the convex hull perimeter is a length of an elastic band when assuming that a projection image obtained by capturing a 3D image of a 3D particle to be measured as a 2D image is surrounded by an imaginary elastic band extending around the outline.

TABLE 1

Circularity Convexity

| | Type of foaming agent/input | Type of foam stabilizer/input | Reynolds number in high-shear mixing | Vortex (s) | CRC (g/g) | 0.7AUP (g/g) | Surface Tension (mN/m) | Circularity | Convexity |
|---|---|---|---|---|---|---|---|---|---|
| Comp. Ex. 1 | SBC 1000 ppm | SDS 200 ppm | — | 43 | 23.8 | 22.1 | 60 | 0.76 | 0.92 |
| Comp. Ex. 2 | SBC 1000 ppm | Ca-st(5 um) 1000 ppm | — | 38 | 23.2 | 23.1 | 70 | 0.74 | 0.90 |
| Comp. Ex. 3 | SBC 1000 ppm | SDS 20 ppm | 10,000 | 40 | 23.8 | 22.2 | 67 | 0.74 | 0.90 |
| Comp. Ex. 4 | SBC 1000 ppm | Ca-st(5 um) 100 ppm | 10,000 | 38 | 23.5 | 23 | 72 | 0.74 | 0.88 |
| Comp. Ex. 5 | SBC 1000 ppm | SDS 20 ppm | — | 60 | 25.2 | 23.3 | 67 | 0.76 | 0.92 |
| Comp. Ex. 6 | SBC 1000 ppm | SDS 20 ppm | 5,000 | 51 | 24.4 | 22.8 | 67 | 0.74 | 0.91 |
| Ex. 1 | SBC 1000 ppm | SDS 20 ppm | 10,000 | 35 | 24.4 | 22.2 | 67 | 0.81 | 0.86 |
| Ex. 2 | SBC 1000 ppm | Ca-st(5 um) 100 ppm | 10,000 | 32 | 24.1 | 23.0 | 72 | 0.83 | 0.85 |
| Ex. 3 | SBC 500 ppm | SDS 20 ppm | 10,000 | 42 | 25.5 | 24.1 | 67 | 0.78 | 0.88 |
| Ex. 4 | SBC 400 ppm | Ca-st(5 um) 100 ppm | 10,000 | 38 | 25.1 | 24.4 | 72 | 0.77 | 0.89 |

Referring to Table 1, the super absorbent polymers of Examples 1 to 4 prepared by adding a foam stabilizer to the monomer mixture first, performing high-shear mixing, and then adding a foaming agent showed an excellent foam stabilizing effect even though a small amount of the foam stabilizer was used in the manufacturing process, exhibited excellent absorption properties without lowering the surface tension, and in particular, had remarkably improved absorption rate. In addition, it can be confirmed that the super absorbent polymers of Examples 1 to 4 had a shape close to a sphere with an average value of circularity of 0.75 or more, and a large surface roughness with an average value of convexity of 0.9 or less.

However, it was confirmed through Comparative Examples 1 to 6 that if the preparation method of the present disclosure is not satisfied, such as adding a foam stabilizer and a foaming agent at the same time, not performing high-shear mixing after adding a foam stabilizer, or the Reynolds number is less than 10,000 during high-shear mixing, the above effect cannot be achieved.

The invention claimed is:

1. A preparation method for a super absorbent polymer comprising:

i) mixing an acrylic acid-based monomer having at least partially neutralized acidic groups; an internal cross-linking agent; and a polymerization initiator to form a mixture;

ii) adding a foam stabilizer to the mixture of i) and performing high-shear mixing at a Reynolds number of 10,000 or more, wherein the foam stabilizer comprises calcium stearate or sodium dodecyl sulfate;

iii) preparing a monomer composition by adding a foaming agent to the mixture of ii), wherein the foaming agent comprises sodium bicarbonate;

iv) preparing a hydrogen polymer by polymerizing the monomer composition; and v) drying, pulverizing, and classifying the hydrogel polymer.

2. The preparation method for a super absorbent polymer of claim 1, wherein the high-shear mixing is performed for 10 seconds to 60 seconds.

3. The preparation method for a super absorbent polymer of claim 1, wherein the high-shear mixing is performed at a Reynolds number of 10,000 to 20,000.

4. The preparation method for a super absorbent polymer of claim 1, wherein a content of the foam stabilizer in the monomer composition is 10 ppm or more and less than 200 ppm.

5. The preparation method for a super absorbent polymer of claim 1, wherein a content of the foaming agent in the monomer composition is 100 ppm to 2,000 ppm.

6. The preparation method for a super absorbent polymer of claim 1, wherein the foaming agent further comprises at least one selected from the group consisting of sodium carbonate, potassium bicarbonate, potassium carbonate, calcium bicarbonate, calcium carbonate, magnesium bicarbonate, and magnesium carbonate.

7. The preparation method for a super absorbent polymer of claim 1, further comprising (vi) forming a surface cross-linked layer by further cross-linking a surface of the super absorbent polymer obtained via the v) drying, pulverizing, and classifying, in the presence of a surface cross-linking agent.

* * * * *